April 29, 1947.          A. ALFORD                2,419,525
                         RADIO BEACON
                      Filed Oct. 8, 1942          2 Sheets-Sheet 2

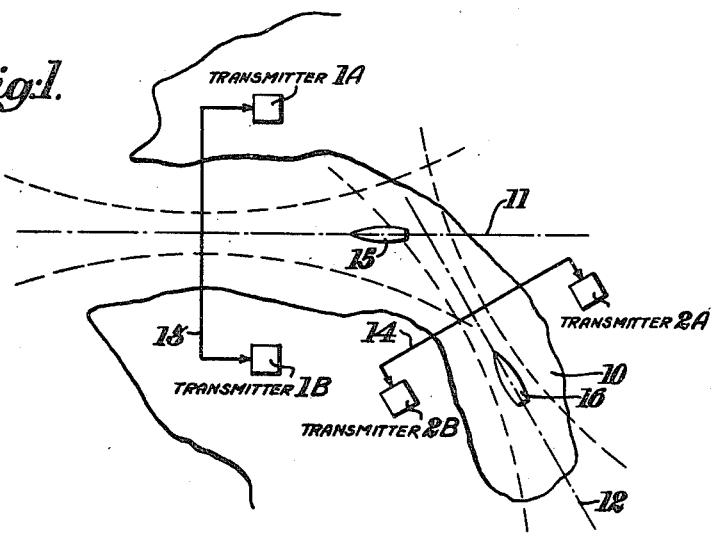
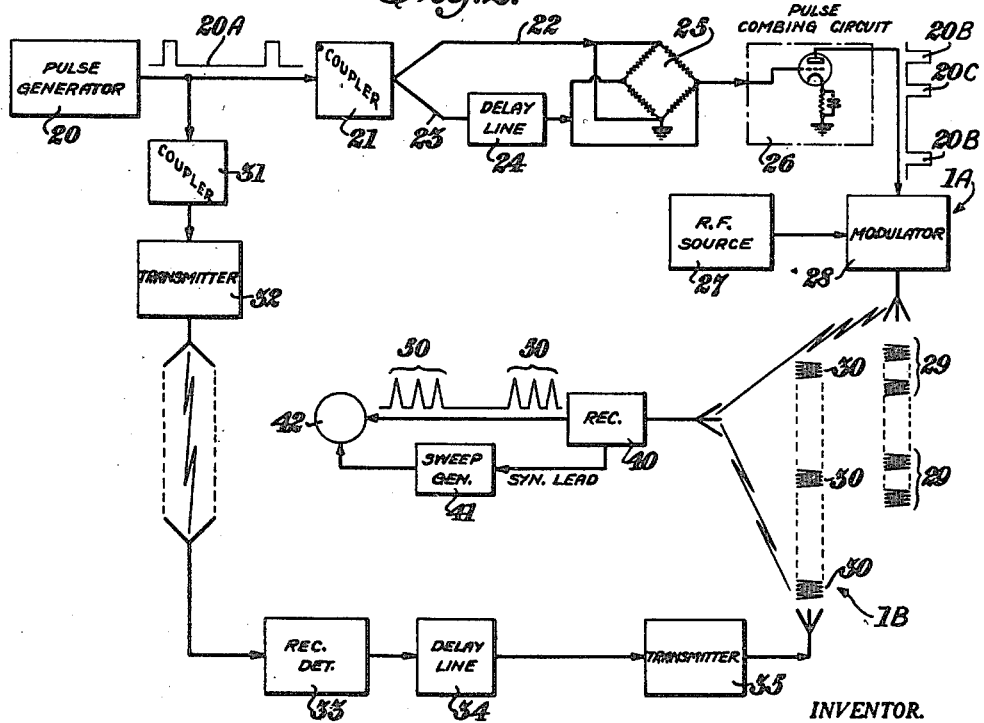

INVENTOR.
ANDREW ALFORD
BY
R. P. Morris
ATTORNEY

Patented Apr. 29, 1947

2,419,525

UNITED STATES PATENT OFFICE 2,419,525

RADIO BEACON

Andrew Alford, New York, N. Y., assignor to Federal Telephone and Radio Corporation, a corporation of Delaware Application October 8, 1942, Serial No. 461,275

15 Claims. (Cl. 250—11)

This invention relates to radio beacons and more particularly to radio beacons capable of use despite the presence of many reflecting objects.

In the previously proposed radio beacon systems, particularly of the type in which equality of signals along a given course line is depended upon for guiding the craft, reflecting objects in the field of the transmitter tend to produce false course indications. For this reason the known forms of equi-signal radio beacons are not well adapted for use where there may be present comparatively large reflecting objects. For example, when it is desired to guide surface craft such as boats into a harbor, the land on either side of the channel may reflect the signals and produce false courses. Furthermore, another boat in the vicinity of the craft being guided to the harbor may cause reflections which will produce false course indications.

It is an object of my invention to provide a beacon which will give correct course indications despite the presence of reflecting objects.

It is a further object of my invention to provide a radio beacon system in which time position of impulses is compared instead of amplitude.

It is a still further object of my invention to provide a beacon system in which a visual indication of the course position is produced by comparison of time position of signal pulses transmitted from spaced points on opposite sides of the course line.

According to a feature of my invention spaced pulses may be transmitted from one side of the course while from the other side of the course are transmitted other pulses timed to occur at a specific position with respect to said pulses first named along the course line. By receiving both sets of these pulses on a common receiver and comparing their time position, the location of the craft relative to the desired course line may be obtained.

According to a further feature of my invention one or both of the series of spaced pulses may be transmitted at an ultra-high frequency in a sharply directive beam. This directive beam may be rotated to traverse over the area defining the course and at the same time the relative time displacement of the pulses with respect to one another may be changed to give any desired shape to this course defined.

A better understanding of my invention and the objects and features thereof may be had from the particular description of a preferred embodiment thereof made with reference to the accompanying drawings, in which:

Fig. 1 is a diagrammatic illustration showing the relative location of beacon transmitters with respect to the course line to be defined;

Fig. 2 is a block circuit diagram of a pair of radio transmitters and a receiving system in accordance with my invention;

Figure 3:
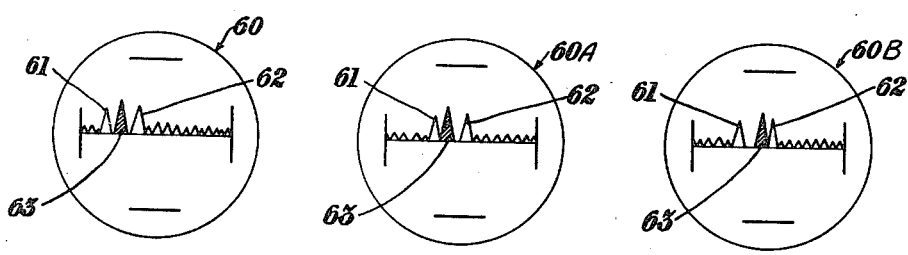
Fig. 3 is an illustration of the visual indications produced in the receiver of Fig. 2.

In Fig. 1 is shown a channel 10 leading to a harbor for water craft. In order that craft may be guided from the open water through the channel, there is provided a radiated field pattern defining a course 11 and a second radiation pattern defining course 12 intersecting course 11 so that craft may be enabled to negotiate the crooked channel. The course 11 may be defined by energy transmitted from transmitters 1A and 1B while course 12 is defined by energy transmitted from transmitters 2A and 2B. Transmitters 1A and 1B are interconnected by a signal channel shown diagrammatically at 13 and transmitters 2A and 2B are interconnected by a signal channel shown diagrammatically at 14. Boats 15, 16 are indicated at different points in the navigation channel. Each of these boats 15 and 16 is provided with suitable receiving apparatus for indicating the position of the craft relative to the particular course line along which it is travelling.

It is known that, if two radio transmitters are spaced apart and transmit energy toward one another over a given area so that overlapping fields of energy are produced, the phase relationship of the energy from the two transmitters will produce a family of curves hyperbolic in shape with the center curve forming a straight line. In accordance with my invention this principle is used but instead of transmitting continuous radio frequency energy, I transmit discrete pulses of energy from the two transmitting stations and by comparing their time position in the overlapping zone produce an indication of the position of the craft along a desired course line. In order that a craft may be guided around a projection it is only necessary that transmitters 1A, 1B and transmitters 2A and 2B operate at different frequencies so that the courses will not be such as to interfere with one another at their point of overlap.

In Fig. 2 the particular circuit arrangement of a preferred system which may be used for one pair of transmitters such as 1A and 1B is shown. At 20 is provided a pulse generator which produces evenly spaced pulses as shown in curve 20A. The spacing of these pulses may be any desired value, for example, the spacing may be such that they occur at intervals of 80 microseconds. Pulse generator 20 is coupled through coupler 21 which may, for example, be a vacuum tube, to separate two wire lines 22 and 23. In line 23 is provided a delay network or line 24 which serves to delay the pulse transmission by a predetermined interval. The energy transmitted over lines 22 and 23 is then combined in a combining network 25 and pulse combining circuit 26 so that in the output of circuit 26 there are pairs of pulses 20B, 20C spaced apart from one another by an amount determined by delay means 24. The pairs of pulses have the same spacing from adjacent pairs as exists between the pulses of 20A.

A radio frequency source 27 supplies energy to modulator 28 and pulse pairs 20B, 20C are also applied to this modulator so that there is transmitted from the circuit 1A spaced pairs of radio frequency pulse trains 29. The radio frequency at which pulses 29 are operating may be any desired value, for example, 150 megacycles and the energy may be emitted at any given level, for example, at 20 watts. It is generally not necessary that the energy be transmitted for great distances when operating over narrow water channels. If, however, the system is to operate over greater distances then correspondingly greater power may be used.

From pulse generator 20 energy is also supplied over a coupler 31 to a radio link transmitter 32 which may operate, for example, at a lower power level of 2 watts and at a frequency of 300 megacycles. This particular energy level and frequency is immaterial, it only being necessary that the radio frequency be such as to prevent interference with the transmitted pulse pairs. The energy is preferably directionally transmitted to a receiving detector arrangement 33 from which it is applied over an adjustable delay line 34 to transmitter 35 of 1B. This transmitter 35 preferably is arranged to operate at a frequency only slightly displaced from the frequency of transmitter 1A so that the signals therefrom will be attenuated substantially the same amount during transmittal and will be readily received on a common receiver mechanism. For example, the energy pulses may be transmitted at a frequency of 150 megacycles+100 kilocycles. Thus, from 1B there are transmitted a series of pulse trains 30 having between them a spacing equal to the spacing between pulse pairs 29 and a time position dependent upon the adjustment of delay line 34. This time position is preferably adjusted so that when a receiver is located on the desired course line pulses 30 will appear to be midway between the pulses of pairs 29.

The receiver 40 receives energy from both 1A and 1B and after detecting these pulses produces in its output symmetrically arranged pulse combinations 50. At the same time the periodic recurrence of the received pulses is used to synchronize the operation of a sweep frequency generator 41, of any known type, which serves to produce a sweep frequency for the cathode ray indicator 42. Thus, the beam of the cathode ray indicator 42 is swept across the screen once for every pulse period of the pulse trains 29. In the example given this repetition will occur once every 80 microseconds. The trains of pulses 50 are applied to the deflecting electrodes of the cathode ray oscillograph 42 arranged at 90° with respect to the sweep electrodes causing on the screen thereof peaks corresponding to the position of the individual received pulse trains. Should the craft depart to one side or the other of the desired course line, then pulses 30 will no longer be received at the midpoint in time of pulse pairs 29 but will be displaced to one side or the other thereof depending upon the direction of departure of the craft from the course. At the same time reflected pulses will also be received but since these are of much lower amplitude than the directly received pulses, they will be readily distinguished from those properly defining the course line.

It is clear that for visual comparison the pulses need not be sent in pairs from one station as indicated. If single pulses are sent from both stations their relative time position may be compared to give a course indication. However, the system using pairs of pulses or some form of wide symmetric pulse is generally preferred since it permits easier comparison as to position.

Turning to Fig. 3, there is shown three typical examples of possible reception patterns on the screen of the cathode ray tube indicator. At 60 there is shown the indication obtained when the craft is on course in which two equally spaced pulses 61, 62 appear at a much higher amplitude than any other indications on the screen and centrally positioned with respect to indications 61, 62 is pulse 63 shown spaced which represents the single pulses 30 of Fig. 2. At 60A is shown the same screen when the craft is displaced to one side of the course line, for example, to the left thereof. In this case pulses 61 and 62 are still spaced apart the same distance but pulse 63 appears to the left closer to pulse 61 instead of in the center. At 60B is shown the screen when the craft is too far to the right. In this case pulse 63 is displaced toward pulse 62 instead of being maintained at the center.

Heretofore, a system has been proposed wherein directive beams are transmitted from opposite sides of a course or channel traversed by a watercraft, the directional beams being at different frequencies and characterized spaced pulses interrupting the transmitted wave. According to this proposed system, comparison of the signals is made aurally by means of two separate receivers connected to separate headphones, one for each ear. When the two nulls coincide the craft is on course. The system also propos variably displacing the null pulses so that the course may be made in any desired shape. For all practical purposes, this prior system is inoperative at radio frequencies since the aural comparison of the time of arrival of two radio frequency signals cannot accurately be made by the human ear. This is readily appreciated when it is considered that in one microsecond, the radio wave will travel a distance of 300 meters. The human ear will not respond sufficiently rapidly to distinguish between sounds arriving at times separated only by a few microseconds. Accordingly, this proposed system could not define the channel sufficiently narrow to be useful in the guidance of ships into a channel or through a mine field.

According to my invention, however, a curved path may be provided since the visual indications are made on a cathode ray oscillograph which may serve to indicate the separation distances much smaller than could be detected by the human ear. In fact, the entire sweep of the cathode ray beam may be made in a small fraction of a second.

Figure 4:
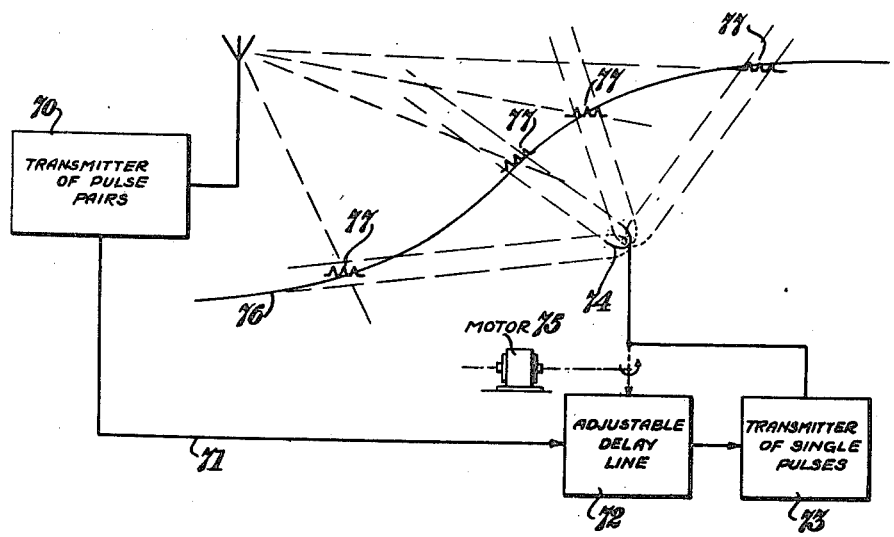
Fig. 4 is an illustration of a modified block circuit in accordance with my invention.

In Fig. 4 is illustrated a system which serves to produce a desired curved course. At 70 is shown a transmitter of pulses preferably of pulse pairs corresponding to the transmitter arrangement shown in Fig. 1 of the drawing. This transmitter preferably operates at an extremely high radio frequency, for example, in the order of 3,000 megacycles. Energy from the transmitter 70 is also applied over a line 71 to an adjustable delay line 72 from whence it is applied to the second transmitter 73 corresponding substantially to the transmitter 1B of Fig. 2. Delay line 72, however, is adjustable, for example, it may incorporate the adjustable features described in the application of A. de Rosa, Serial No. 454,198, filed August 8, 1942. The transmitting antenna 74 coupled to transmitter 73 is made sharply directional. A very sharply directive beam may be produced in known manner particularly when ultra high frequencies of the type specified above are used. This directive antenna is rotated by any known means such as motor 75 so that the beam will traverse line 76 depicting the course at repeated intervals at sufficient speed to maintain persistence of vision on the indicator screen. At the same time antenna 74 is rotated, adjustable delay 72 is operated to provide varying time delays of the pulse train transmitted from 73 with respect to the pulse train emitted from transmitter 70. By providing this variable adjustment in delay coinciding with the directional adjustment of an antenna 74, the pulse pairs transmitted from 70 and the signal pulses transmitted from 73 may be made to coincide as indicated at 77 in the drawing along line 76. Thus, a craft may be guided along this curved line merely by maintaining the readings on the receiver oscilloscope properly centered as he advances. This system may be particularly useful in guiding craft over channels which may be altered from time to time. In order to alter the shape of the course, it is merely necessary to change adjustable delay line 72 to produce different delays in any particular direction as the direction of transmission is varied.

It is, of course, clear that a similar directive antenna might be used with transmitter 70 and the two units rotated simultaneously to intercept along the particular course line. In general, this complication, however, is not necessary since all of the desired variation may readily take place at a single transmitter as shown in Fig. 4.

It is clear that when conditions permit an ordinary transmission line may be used for supplying energy from pulse generator 20 to transmitter 35 instead of the radio link illustrated. The radio link, however, is generally preferable when the beacon is to be applied to a water channel since it is much cheaper and easier to construct the radio link mechanism than to provide ring land lines around the entire channel or high frequency submarine cable to transmit the pulses.

It should also be understood that while I have described my invention as applied to the guiding of water craft or other craft which travel close to the earth's surface the principles of my invention apply likewise to the guiding of any craft and may be utilized for normal course or localizer beacons for aircraft. Furthermore, it is clear that instead of producing pairs of pulses as shown above, any desired symmetrical pulse formation may be used so long as a ready comparison between this pulse formation and the pulse transmitted from 1B can be made. It is also clear that the central position of the pulse need not be used as a reference position although in most cases this will be found to be preferable.

Since, in accordance with my system, comparison is made wholly on a time basis and not upon amplitude basis, the relative changes in amplitude of the two signals does not effect an error in the course line. Moreover, any one of the desired parabolic curves produced by the transmitting systems may be utilized as the course line in which case it is merely necessary to adjust the delay in line 34 to such a position that the pulses will combine in symmetrical arrangements along the selected course. Moreover, while radio is the preferred medium used in my invention, the principles thereof apply to other type of signals, for example, to supersonic wave transmission.

It will be clear that many modifications and adaptations in the details of my invention will occur to those skilled in the art without departure from the spirit thereof, as set forth in the description of my invention and embodied in the accompanying claims.

What is claimed is:

1. A beacon system for defining a course line comprising means for transmitting energy in the form of spaced pairs of spaced pulses from a point on one side of said line, means for transmitting other pulses spaced at the same intervals as the spacing of said pairs of pulses, from a point on the other side of said line, means for receiving energy from both said transmitting means, and visual indicator means in the output of said receiver means for indicating the position of said other pulses with respect to said pairs of spaced pulses to provide an indication of the position of said receiver with respect to said course line.

2. The method of determining the position of a craft with respect to a desired course line, comprising radiating energy in the form of spaced pairs of pulses over the area including said course line, radiating other energy of pulses spaced apart the same as said pairs of pulses from a point spaced from the point of radiation of said pairs of pulses on the other side of said course, receiving all said pulses on said craft, and producing a visual indication showing the relative time position of said pairs of pulses and said spaced pulses to indicate the position of said craft with respect to said course line.

3. A radio beacon system comprising a pulse generator for producing spaced pulses, means for producing from each of said pulses pairs of spaced pulses, a first radio transmitter, means for applying said pairs of spaced pulses to said transmitter to produce transmission of pairs of radio frequency pulses, a second transmitter spaced from said first transmitter, and means for supplying to said second transmitter spaced pulses from said pulse generator to produce transmission of other radio frequency pulses corresponding thereto, whereby the radio frequency pulse patterns from said transmitters form predetermined pulse spacing lines defining predetermined courses.

4. A radio beacon system according to claim 3 wherein means is provided for producing a predetermined time relation between said pairs of radio frequency pulses, and said other radio frequency pulses to determine the position of said predetermined courses.

5. A radio beacon system according to claim 3 further comprising a receiver for said radio frequency, and means for indicating the relative time of reception of said pulses to determine the position of said receiving means with respect to a desired one of said predetermined courses.

6. A radio beacon system comprising a pulse generator for producing first spaced pulses, a first radio transmitter, means for applying said first spaced pulses to said transmitter to produce transmission of first radio frequency pulses, a second transmitter spaced from said first transmitter, means for supplying to said second transmitter spaced pulses from said pulse generator to produce transmission of second radio frequency pulses corresponding thereto, whereby the radio frequency pulse patterns from said transmitters form predetermined pulse spacing lines defining predetermined courses, said means for transmitting said second spaced pulses producing a sharply directional radiation pattern, further comprising means for continuously traversing said sharply directive pattern over one of said courses at a rate at least equal to that necessary to persistence of vision, and means for varying the time position of said second spaced pulses in predetermined relation with the traversal of said patterns, whereby said predetermined courses produced by said pattern may be directionally adjusted.

7. A beacon system for defining a course line comprising means for transmitting energy in the form of first spaced pulses from a point on one side of said line, means for transmitting second spaced pulses at the same intervals as the spacing of said first pulses in a sharply directive pattern from a point on the other side of said line, means for continuously traversing said sharply directive pattern over said course line at a rate at least equal to that necessary to persistence of vision, means for varying the time position of said second spaced pulses in predetermined relation with the traversal of said pattern, means for receiving energy from both transmitting means and visual indicator means in the output of said receiver means for indicating the relative timing of said first and second spaced pulses to provide an indication of the position of said receiver with respect to directionally adjusted points along said course line.

8. A beacon for defining a course comprising means for transmitting pairs of radio frequency pulses having a given spacing from a position on one side of said course, said pairs being spaced apart a distance greater than the spacing between the impulses of a pair, and means for transmtting from a position on the other side of said course single radio frequency pulses of a duration less than said given spacing and timed in recurrence with respect thereto to provide a spacing between said single pulses equal to the spacing between said pairs, whereby along said course said other pulses will be symmetrically disposed with respect to said pairs of pulses.

9. The method of providing a course line and determining the position of a craft with respect to said course, comprising radiating energy in the form of first spaced pulses over the area including said course line, radiating other energy of second pulses spaced apart the same as said first pulses from a point spaced from the point of radiation of said pairs of pulses on the other side of said course, receiving all said pulses on said craft, producing a visual indication showing the relative time position of said first pulses and said second pulses to indicate the position of said craft with respect to said course line, confining radiation of said second pulses to a sharply directive pattern, traversing said directive pattern over the area including said course line at a repeated cycle higher than the speed necessary for persistence of vision, and adjusting the time position of said second pulses in predetermined relation with traversal of said directive pattern, to produce a desired directional adjustment of said course.

10. The method of determining the position of a craft with respect to a desired course line, comprising radiating energy in the form of spaced pairs of pulses over the area including said course line, radiating other energy of pulses spaced apart the same as said pairs of pulses from a point spaced from the point of radiation of said pairs of pulses on the other side of said course, receiving all said pulses on said craft, and producing a visual representation of said pulses showing the relative time position of said pairs of pulses and said spaced pulses to indicate the position of said craft with respect to said course line.

11. A beacon system for defining a course line comprising means for transmitting first pulses of energy from a first point, means for transmitting second pulses of energy having a predetermined variable time relation with respect to said first pulses in a directive pattern from a second point, means for traversing said pattern over said course line in a predetermined manner, means for varying the time relation of said first and second pulses in a predetermined relation with the traversal of said pattern, means for receiving said first and second pulses and means in the output of said receiving means for indicating the relative propagation times of said first and second pulses to provide an indication of the position of said receiving means with respect to directionally adjusted points along said course line.

12. A beacon system for determining the location of a craft comprising means for transmitting pulses of energy from a first pair of spaced points, the pulses transmitted from one of said points having a predetermined time relation with respect to the pulses transmitted from the other of said points, means for transmitting pulses of energy from a second pair of spaced points, the pulses transmitted from one of said second pair of points having a predetermined time relation with respect to the pulses transmitted from the other of said second pair of points, means for receiving the pulses transmitted from said points and means responsive to said receiving means for measuring the relative propagation times of said pulses from said points to said receiving means whereby the location of said receiving means with respect to said points is determined.

13. In a beacon system wherein course line indications are produced in a receiver by comparison of the relative timing of received pulses, a beacon for defining intersecting course lines comprising means for transmitting pulses of energy having predetermined time spacings from a plurality of first substantially fixed positions, and means for transmitting pulses from a plurality of second substantially fixed positions at predetermined time intervals with respect to the pulses transmitted from said first positions, said time intervals being small in comparison to said time spacings.

14. A beacon system according to claim 13, wherein said time intervals are substantially equal to zero.

15. In a beacon system wherein course line indications are produced in a receiver by comparison of the relative timing of received pulses, a beacon for defining intersecting course lines comprising means for transmitting pulses of energy having predetermined time spacings from a plurality of first substantially fixed positions, means for transmitting pulses of energy from a plurality of second substantially fixed positions, the pulses transmitted from each second station being transmitted at predetermined time intervals after pulses transmitted from a first station and said time intervals being small in comparison to said time spacings, and means for varying said time intervals.

ANDREW ALFORD.

REFERENCES CITED

The following references are of record in the file of this patent:

UNITED STATES PATENTS

| Number | Name | Date |
|---|---|---|
| 2,288,196 | Kramar | June 30, 1942 |

FOREIGN PATENTS

| Number | Country | Date |
|---|---|---|
| 795,953 | France | Jan. 13, 1936 |
| 803,926 | France | July 20, 1936 |